(12) United States Patent
Satake et al.

(10) Patent No.: US 7,295,338 B2
(45) Date of Patent: Nov. 13, 2007

(54) STATUS INFORMATION ACQUISITION FROM PLURAL FUNCTIONS INCLUDED IN IMAGE PROCESSING APPARATUS

(75) Inventors: Makoto Satake, Chiba (JP); Ryoji Kanoyadani, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 999 days.

(21) Appl. No.: 10/414,859

(22) Filed: Apr. 17, 2003

(65) Prior Publication Data

US 2003/0197890 A1    Oct. 23, 2003

(30) Foreign Application Priority Data

Apr. 22, 2002    (JP) .............................. 2002-119347

(51) Int. Cl.
   *G06F 15/00*    (2006.01)
(52) U.S. Cl. ..................................... 358/1.15; 358/442
(58) Field of Classification Search ............... 358/1.15, 358/1.16, 442, 444; 710/5, 40, 36; 709/203, 709/218, 224
   See application file for complete search history.

(56) References Cited

U.S. PATENT DOCUMENTS 6,490,052 B1 *  12/2002  Yanagidaira ............... 358/1.15
6,711,626 B1 *   3/2004  Okada .......................... 710/5

FOREIGN PATENT DOCUMENTS

| JP | 7-288625 | 10/1995 |
| JP | 2001-222503 | 8/2001 |
| JP | 2002-077499 | 3/2002 |

OTHER PUBLICATIONS

"Universal Serial Bus Specification Revision 1.1", Compaq Intel Microsoft NEC, pp. 21-23, Sep. 1998.

* cited by examiner

*Primary Examiner*—Kimberly A. Williams
(74) *Attorney, Agent, or Firm*—Fitzpatrick, Cella, Harper & Scinto

(57) ABSTRACT

An image processing apparatus comprising: a data processing unit such as a printing unit; a first interface having a plurality of logical channels for connecting with an external processing apparatus; a second interface, compliant with the same communication standard as the first interface and having a plurality of logical channels that have a different configuration from the first interface, for connecting with the data processing unit; and a control unit for controlling data transfer between the first interface and the second interface is provided. The control unit controls to acquire status information of the data processing unit via a first logical channel of the second interface in response to a request command of status information of the data processing unit which is received from the external processing apparatus via the first interface, and acquire status information of the data processing unit via a second logical channel of the second interface at predetermined timing regardless of existence/absence of a request command of status information from the external processing apparatus.

14 Claims, 12 Drawing Sheets

STATUS INFORMATION ACQUISITION FROM PLURAL FUNCTIONS INCLUDED IN IMAGE PROCESSING APPARATUS

FIELD OF THE INVENTION

The present invention relates to registering and acquiring status information items in/from each function in an image processing system including a data processing terminal and an image processing apparatus having plural functions.

BACKGROUND OF THE INVENTION

As a known facsimile apparatus connectable with a data processing terminal, such as a personal computer, there is a facsimile apparatus connected with the terminal through a two-way parallel port (compliant with IEEE 1284) interface, e.g., Centronics or the like, or a Universal Serial Bus (USB) interface, as disclosed in Japanese Patent Application Laid-Open No. 7-288625.

In an image processing system constructed with the aforementioned facsimile apparatus and data processing terminal, as a connection form between the facsimile apparatus and data processing terminal, a single logical interface is assigned to a single physical interface.

Furthermore, the main control unit and printing unit included inside the facsimile apparatus are connected through one-way parallel communication and a two-way serial interface.

As an example of the facsimile apparatus which constitutes the image processing system according to the conventional art, a brief configuration of an image processing apparatus 1100 is described in detail with reference to FIG. 12.

In the image processing apparatus 1100, a CPU 1101 serving as a system control unit controls the entire image processing apparatus 1100. ROM 1102 stores control programs and an incorporated operating system (OS) program or the like, which are executed by the CPU 1101. Each of the control programs stored in the ROM 1102 executes software controlling, e.g., scheduling, task switch and so on, under the control of the incorporated OS stored in the ROM 1102.

RAM 1103, configured with SRAM (static RAM) or the like, stores program control variables or the like and set values registered by an operator as well as control data of the image processing apparatus 1100 and so on, and includes a buffer area for various works. Image memory 1104, configured with DRAM (dynamic RAM) or the like, stores image data.

A data conversion unit 1105 performs image data conversion, such as interpretation of a page description language (PDL) or the like, CG (computer graphics) development of character data and so on.

A reading control unit 1106 performs various image processing, e.g., binarization, halftone processing or the like, on an image signal obtained by a reading unit 1107, which optically reads an original document with the use of a contact image sensor (CIS) and converts the read data to electric image data, through an image processing control unit (not shown) and outputs high-definition image data. Note that the reading control unit 1106 and reading unit 117 are adaptable to both a sheet-reading control method, which performs reading by a CIS image sensor fixed at a predetermined position while conveying an original document, and a book-reading control method, which scans an original document placed on a platen while moving the CIS image sensor.

An operation display unit 1108, including numeric value input keys, character input keys, one-touch telephone number keys, mode setting keys, an OK key, a cancel key and so on, is constructed with an operation unit for a user to decide image transmission destination data or to perform registration operation of setting data, various keys, a light-emitting diode (LED), a liquid crystal display (LCD), and a display unit for displaying operator's various input operations and an operation state or status of the image processing apparatus 1100.

A communication control unit 1109 is constructed with a modulator-demodulator (MODEM), a network control unit (NCU) and so on. The communication control unit 1109 is connected with an analogue communication line (PSTN) 1131 to perform, for instance, communication control according to the T30 protocol, or perform line control such as call out and call in of the communication line.

A resolution conversion processing unit 1110 performs resolution conversion control, such as millimeter-to-inch resolution conversion of image data. Note that in the resolution conversion processing unit 1110, enlargement/reduction processing of image data is possible. A coding/decoding processing unit 1111 performs coding/decoding processing on image data (non-compressed or compressed in accordance with MH, MR, MMR, JBIG, JPEG or the like) handled by the image processing apparatus 1100, or performs enlargement/reduction processing.

A print control unit 1112 performs various image processing, e.g., smoothing, print density correction, color correction and so on, on image data subjected to printing through an image processing control unit (not shown), and converts the data to high-definition image data to be outputted to an IEEE 1234 host control unit 1114 (to be described later).

A USB function control unit 1113, which performs communication control of a USB interface, performs protocol control according to the USB communication standard, converts data transmitted from a USB control task executed by the CPU 1101 into a packet, and transmits the USB packet to an external data processing terminal, and inversely, converts a USB packet from an external data processing terminal into data and transmits the data to the CPU 1101.

The IEEE 1284 host control unit 1114 is a control unit for performing communication according to a protocol designated by a compatibility mode of the IEEE 1284 communication standard. The compatibility mode of the IEEE 1284 communication standard, capable of one-way data communication, can connect one host (master) with one peripheral (slave). The IEEE 1284 host control unit 1114 serves as the host in the IEEE 1284 communication, and transmits only print data to a printing unit 1115 (to be described later).

The printing unit 1115, which is a printing device configured with a laser beam printer, inkjet printer or the like, prints color image data or monochrome image data on a printing material. The printing unit 1115 communicates with the IEEE 1284 host control unit 1114 according to a protocol designated by the compatibility mode of the IEEE 1284 communication standard. Particularly the printing unit 1115 serves as the peripheral. In the IEEE 1284 communication, the printing unit 1115 receives print data from the IEEE 1284 host control unit 1114. Meanwhile, the printing unit 1115 performs asynchronous serial interface (UART) communication with a serial I/F control unit 1116 (to be described later). In the asynchronous serial interface communication, the printing unit 1115 receives a command from or transmits print status data to the serial I/F control unit 1116.

The serial I/F control unit 1116 is a control unit for performing asynchronous serial interface communication. Asynchronous serial interface communication is low-speed data communication capable of full-duplex transmission. The serial I/F control unit 1116 transmits a command to or receives print status data from the printing unit 1115.

The aforementioned components 1101 to 1106, 1108 to 1114 and 1116 are connected to each other through a CPU bus 1121 controlled by the CPU 1101.

In an image processing system having the above-described conventional image processing apparatus, a single logical interface is assigned to a single physical interface as mentioned above. Furthermore, in addition to a one-way physical interface for the main control unit to transmit image data to the printing unit for printing, another two-way physical interface is necessary for acquiring status information of the printing unit. This causes problems of an increased product designing work and complicated control.

In order to solve the above problems, a universal serial bus (USB) is adopted to the physical interface between the data processing terminal and facsimile apparatus, and also to the physical interface between the control unit and printing unit of the facsimile apparatus, thereby providing a plurality of logical channels compliant with the USB standard (USB composite device). By virtue of this configuration, it is no longer necessary to provide a physical interface for acquiring status information of the printing unit in addition to the interface provided for the main control unit to transmit image data to the printing unit. As a result, a reduced number of designing processes, ease of making changes, and improved data permeability can be expected.

Moreover, generally in a case where an external data processing terminal uses a printer to print out image data, it is necessary to start driver software on the external data processing terminal and acquire status information of the printer through the USB. At the time of USB connection, a printing unit information registration command is transmitted from a USB host via an end point 1 (Bulk-Out), serving as a USB logical channel, to register in the printer items of the printing unit status information to be acquired. At desired timing of status information acquisition, a reverse request (In-Token) is transmitted from the USB host using an end point 2 (Bulk-In), serving as a USB logical channel. In response, information regarding the items registered in initial setting is returned from a USB function unit of the printer using the end point 2.

Similarly to the foregoing method, in a case where the aforementioned external data processing terminal is connected to the facsimile apparatus via the USB in the above-described image processing system to print out image data, a printing unit information registration command transmitted from driver software, which is launched on the data processing terminal, is received by the control unit of the facsimile apparatus, and the command is transferred to the printing unit via the end point 1 of the internal USB host, thereby registering in the printing unit items of the printing unit status information to be acquired by the driver software. At desired timing of acquisition, the control unit of the facsimile apparatus transmits a reverse request from the USB host using an end point 2. In response, information regarding the registered items is returned from the USB function unit of the printing unit using the end point 2, thereby providing information of the printing unit necessary to the driver software working on the data processing terminal. In the above method, since the printer driver software installed in the printing unit can be used without alteration, it provides an advantage in that controlling of the printing unit can also be realized with ease.

Furthermore, in order to perform operation of the functions, such as copying, recording of facsimile reception or the like, it is necessary for the control unit of the facsimile apparatus to regularly monitor the status of the printing unit through the USB. Therefore, as similar to the above-described method, the following control can easily be considered. More specifically, at the time of turning on the power, the control unit of the facsimile apparatus transmits a printing unit information registration command from the USB host using the end point 1 to register items of the printing unit status information. At desired timing of acquisition, the control unit of the facsimile apparatus transmits a reverse request from the USB host using the end point 2. In response, information regarding the registered items is returned from the USB function unit of the printing unit using the end point 2. According to the above method, there is an advantage in that the acquisition control of printing unit status information becomes common.

In the image processing system having the above-described configuration, when the power is turned on, items of the printing unit status information are registered in the printing unit for internally monitoring the facsimile apparatus. However, if a data processing terminal is connected with the facsimile apparatus and printing unit status information is registered from the driver software, the registration is written over the items which have been registered in the printing unit for internally monitoring the facsimile apparatus. Because the driver software working on the data processing terminal and the main control unit of the facsimile apparatus request printing unit status information via the same logical channel using the same method, it is unable to distinguish whether a reverse request from the printing unit is from the main control unit or from the external data processing terminal. Therefore, in response to a reverse request from the main control unit, status information for the items registered by the driver software is returned. In a case where items requested and registered by the driver software are different from items requested and registered for internally monitoring the facsimile apparatus, the printing unit status information returned in response to the reverse request becomes inconsistent.

Furthermore, if the driver software working on the data processing terminal and the internal unit of the facsimile apparatus attempt to acquire printing unit status information via the same channel (end point 1 or 2), the control unit must determine from where the status information is transferred, in order to correctly return a response. Therefore, it may cause disadvantages, such as complicated control or delayed response timing.

In addition, since the end point 1 of the USB is normally used as an image data transmission channel, it tends to be busy due to printing unit errors. Such errors cause interruption in transmission of the printing unit information registration command using the end point 1, thus disabling the registration of the printing unit status information.

SUMMARY OF THE INVENTION

The present invention has been made in consideration of the above situation, and has as its object, in an image processing system including a data processing terminal and an image processing apparatus having a plurality of functions, to reliably and quickly perform registration of status information items in each function and acquisition of status information as necessary by the data processing terminal and an internal unit of the image processing apparatus.

According to the present invention, the foregoing object is attained by providing an image processing apparatus comprising: a data processing unit; a first interface unit, having a plurality of logical channels, adapted to connect with an external processing apparatus; a second interface unit, compliant with a same communication standard as the first interface unit and having a plurality of logical channels that have a different configuration from the first interface unit, adapted to connect with the data processing unit; and a control unit adapted to control data transfer between the first interface unit and the second interface unit, wherein the control unit controls to acquire status information of the data processing unit via a first logical channel of the second interface unit in response to a request command of status information of the data processing unit which is received from the external processing apparatus via the first interface unit, and acquire status information of the data processing unit via a second logical channel of the second interface unit at predetermined timing regardless of existence/absence of a request command of status information from the external processing apparatus.

According to the present invention, the foregoing object is also attained by providing a communication control method of an image processing apparatus including: a data processing unit; a first interface unit, having a plurality of logical channels, adapted to connect with an external processing apparatus; a second interface unit, compliant with a same communication standard as the first interface unit and having a plurality of logical channels that have a different configuration from the first interface unit, adapted to connect with the data processing unit; and a control unit adapted to control data transfer between the first interface unit and the second interface unit, the method comprising: a data reception step of receiving data from the external processing apparatus via the first interface unit; a determination step of determining whether or not the received data is a request command of status information of the data processing unit; a first data acquisition step of acquiring status information of the data processing unit via a first logical channel of the second interface unit in a case where the received data is a request command of status information of the data processing unit; and a second data acquisition step of acquiring status information of the data processing unit via a second logical channel of the second interface unit at predetermined timing regardless of data reception/non reception in the data reception step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
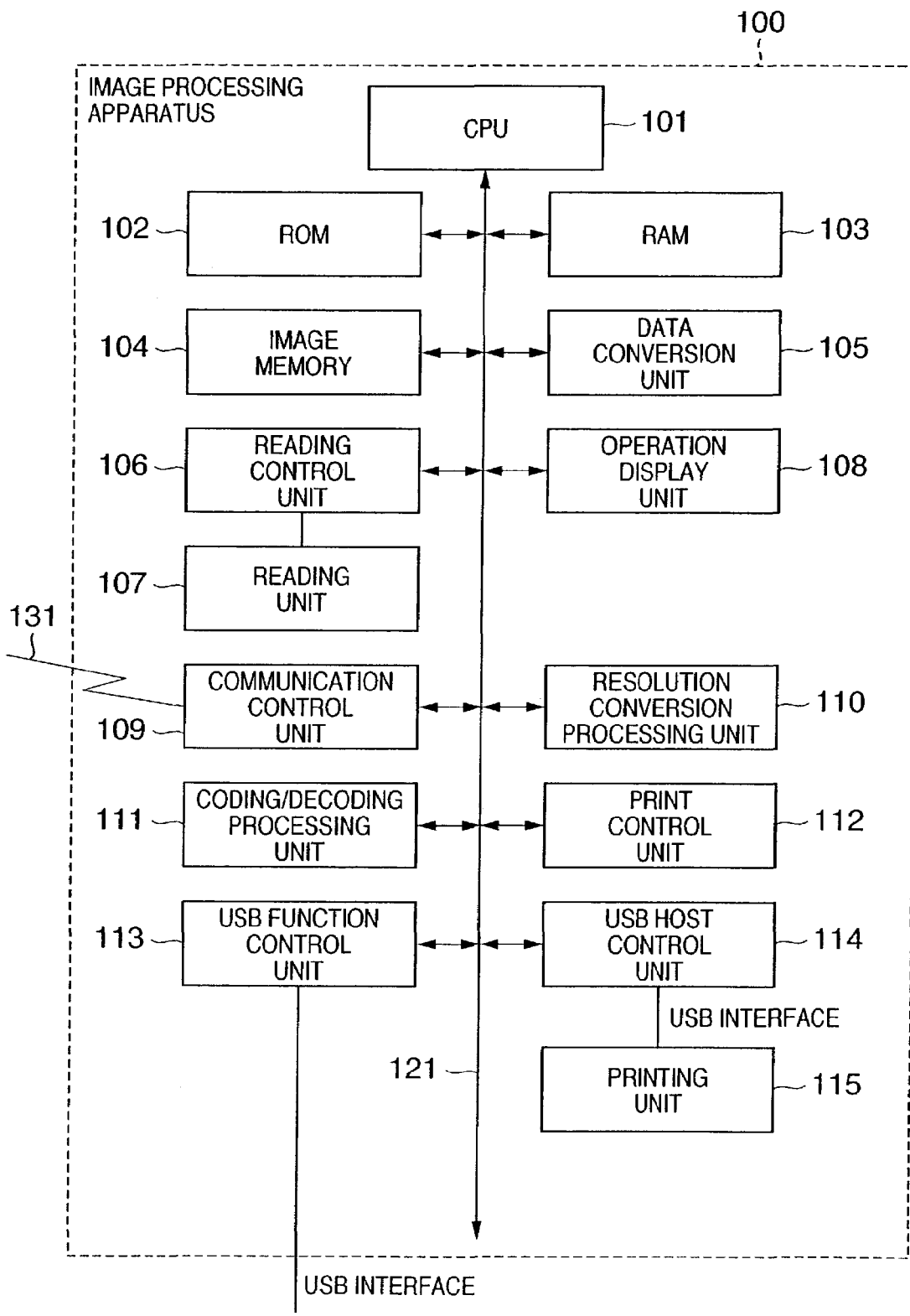
FIG. 1 is a block diagram showing a construction of an image processing apparatus according to an embodiment of the present invention.

First, a brief construction of an image processing apparatus 100, which constitutes an image processing system according to the embodiment of the present invention, is described in detail with reference to FIG. 1.

In the image processing apparatus 100, a CPU 101 serving as a system control unit controls the entire image processing apparatus 100. ROM 102 stores control programs and an incorporated operating system (OS) program or the like, which are executed by the CPU 101. In this embodiment, each of the control programs stored in the ROM 102 realizes software controlling, e.g., scheduling, task switch and so on, under the control of the incorporated OS stored in the ROM 102.

RAM 103, configured with SRAM (static RAM) or the like, stores program control variables or the like, and set values registered by an operator as well as control data of the image processing apparatus 100, and so on, and includes a buffer area for various works. Image memory 104, configured with DRAM (dynamic RAM) or the like, stores image data.

A data conversion unit 105 performs image data conversion, such as interpretation of a page description language (PDL) or the like, CG (computer graphics) development of character data and so on.

A reading control unit 106 performs various image processing, e.g., binarization, halftone processing or the like, on an image signal obtained by a reading unit 107, which optically reads an original document with the use of a contact image sensor (CIS) and converts the read data to electric image data, through an image processing control unit (not shown) and outputs high-definition image data. Note in this embodiment, the reading control unit 106 is adaptable to both a sheet-reading control method, which performs reading while conveying an original document, and a book-reading control method, which scans an original document placed on a platen.

An operation display unit 108 includes numeric keys, character keys, one-touch telephone number keys, mode setting keys, an OK key, a cancel key and so on. The operation display unit 108 is constructed with an operation unit for a user to decide an image transmission destination and to perform registration operation of setting data, various keys, a light-emitting diode (LED), a liquid crystal display (LCD), and a display unit for displaying operator's various input operations and an operation state or status of the image processing apparatus 100.

A communication control unit 109 is constructed with a modulator-demodulator (MODEM), a network control unit (NCU) and so on. In this embodiment, the communication control unit 109 is connected with an analogue communication line (PSTN) 131 to perform communication control according to, for instance, the T30 protocol, or perform line control such as call out and call in of the communication line. Note that the types of communication line and communication protocol are not limited to those mentioned above. Regardless of wired or wireless communication, an available communication line and communication protocol may be employed.

A resolution conversion processing unit 110 performs resolution conversion control, such as millimeter-to-inch resolution conversion of image data. Note that in the resolution conversion processing unit 110, enlargement/reduction processing of image data is possible. A coding/decoding processing unit 111 performs coding/decoding processing on image data (MH, MR, MMR, JBIG, JPEG or the like) handled by the image processing apparatus 100, and performs enlargement/reduction processing.

A print control unit 112 performs various image processing, e.g., smoothing, print density correction, color correction and so on, on image data subjected to printing through an image processing control unit (not shown), and converts the data to high-definition image data to be outputted to a USB host control unit 114 (to be described later). Furthermore, by controlling the USB host control unit 114, the print control unit 112 also serves to regularly acquire status information of the printing unit 115.

A USB function control unit 113, which performs communication control of a USB interface, performs protocol control according to the USB communication standard, converts data from a USB control task executed by the CPU 101 into packets, and transmits the USB packets to an external data processing terminal, and inversely, converts USB packets from an external data processing terminal into data and transmits the data to the CPU 101.

The USB host control unit 114 controls communication according to a protocol defined by the USB communication standard. The USB communication standard, capable of high-speed two-way data communication, can connect one host (master) with a plurality of hubs or peripherals (slaves). The USB host control unit 114 serves as the host in the USB communication.

The printing unit 115, which is a printing device configured with a laser beam printer, inkjet printer or the like, prints color image data or monochrome image data on a printing material. The printing unit 115 communicates with the USB host control unit 114 according to a protocol defined by the USB communication standard. Particularly, the printing unit 115 serves as the slave. In this embodiment, the USB communication for using a printing function adopts a one-to-one connection form.

The aforementioned components 101 to 106 and 108 to 114 are connected to each other through a CPU bus 121 which is controlled by the CPU 101.

Figure 2:
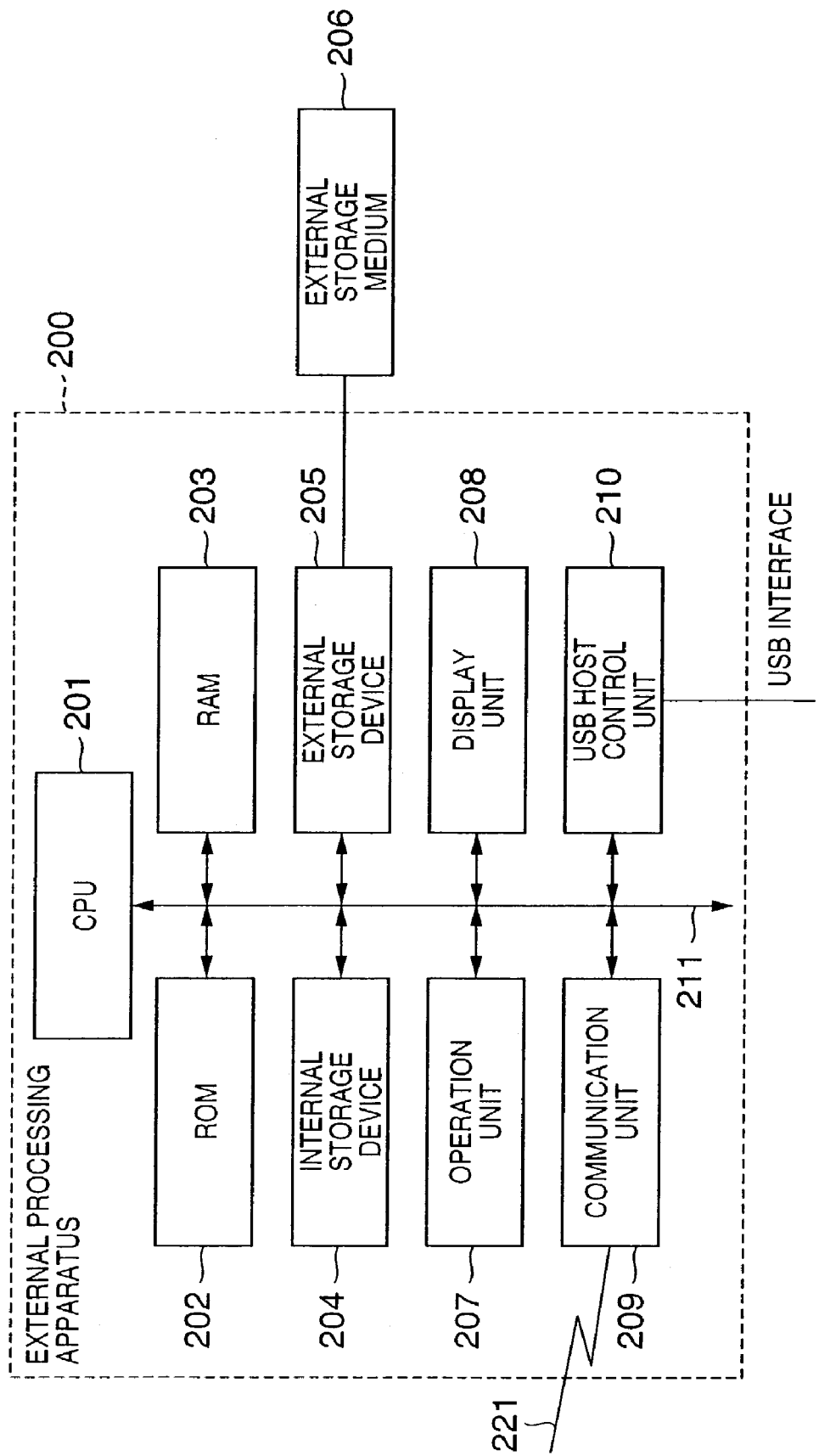
FIG. 2 is a block diagram showing a construction of a processing apparatus according to the embodiment of the present invention.

Next, a brief construction of a processing apparatus 200, e.g., a data processing terminal, which constitutes the image processing system together with the image processing apparatus 100, is described with reference to FIG. 2.

A CPU 201 controls the entire operation of the processing apparatus 200 through a system bus, according to a program which is read out of ROM 202, RAM 203, or an internal storage device 204, or a program read out of an external storage medium 206 by an external storage device 205.

The ROM 202 stores a control program or the like of the CPU 201. The RAM 203 temporarily stores a program or image data to enable high-speed processing of the processing apparatus 200.

The internal storage device 204 stores an operating system, various application programs, image data and so on. Assume that the internal storage device 204 is installed with application software for transmitting/receiving various commands and data to/from the image processing apparatus 100, which include character data processing steps according to the present embodiment, printer driver software, scanner driver software, facsimile driver software, USB-class driver software for each function, USB bus driver software and so forth. Normally, these application software and driver software are installed by receiving data from another computer-readable medium storing the software by the external storage medium 206 (medium such as a floppy disk or CD-ROM), and controlling the external storage device 205. Alternatively, the application software and driver software can be received by a communication unit 209 (network or modem) through a communication line and installed in the internal storage device 204.

An operation unit 207 controls a keyboard or a mouse (not shown), which serves as operator's designation input means. To execute printing, normally the keyboard or mouse of the operation unit 207 is used.

A display unit 208 performs various displaying for an operator. In a case where printing execution is designated by the external processing terminal 200, a confirmation dialogue or the like is displayed on the display unit 208 to prompt an operator to input. Further, during execution of a printing operation, information indicative of print statuses is provided to the operator.

The communication unit 209 realizes connection with a network (not shown), realizes connection with an Internet provider through a communication line, and performs communication of data, image data or the like with a destination communication apparatus. Note with respect to connection with a network or a communication line, assume that a well-known method is used; thus a description thereof is omitted.

A USB host control unit 210, which performs communication control of a USB interface, converts data from the CPU 201 into packets in accordance with the USB communication standard and transmits the USB packets to the image processing apparatus 100, and inversely, converts USB packets from the image processing apparatus 100 into data and transmits the data to the CPU 201. With respect to a communication control method, assume that a well-known communication control method is used; thus a description thereof is omitted.

Figure 3:
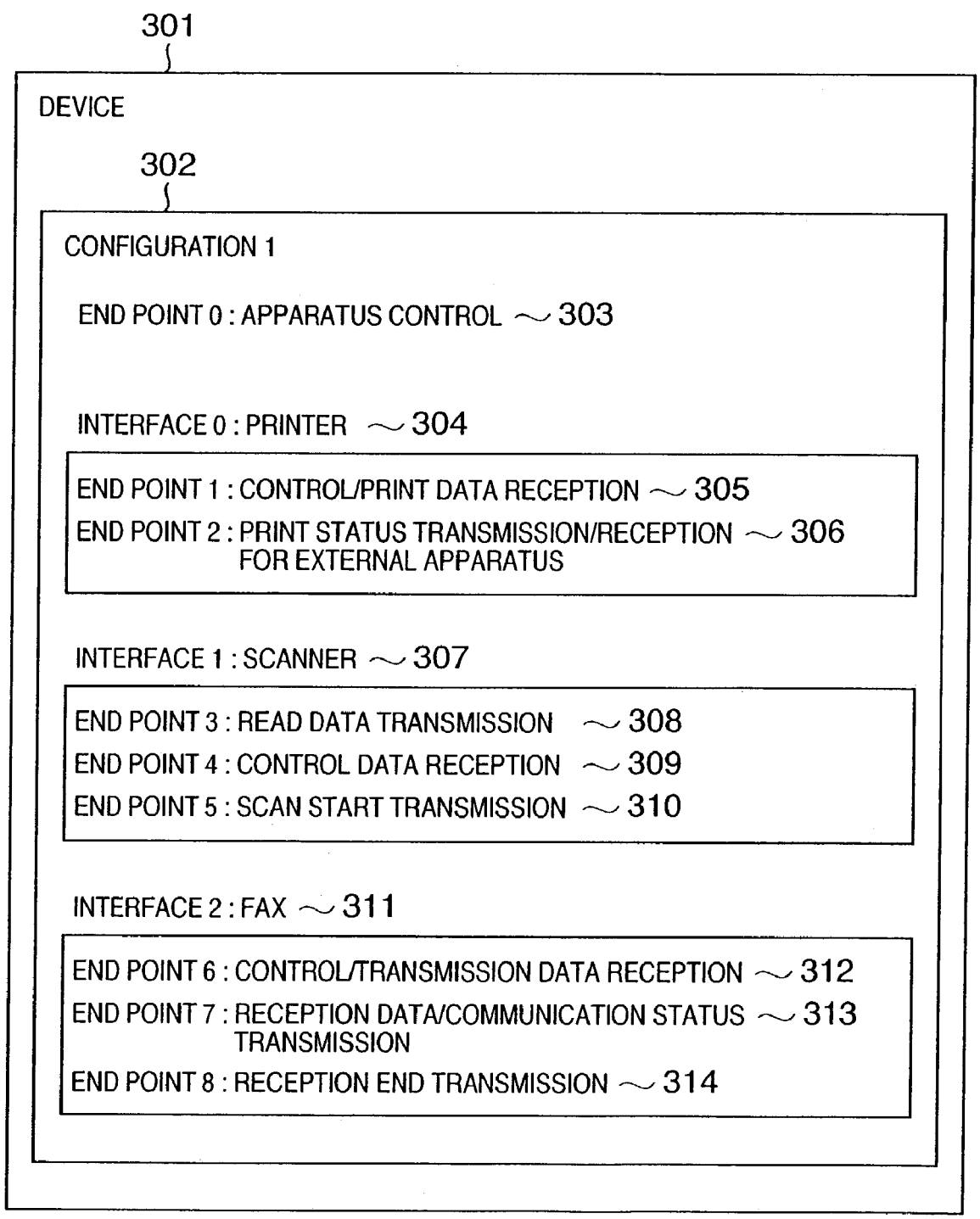
FIG. 3 is a conceptual view showing a USB configuration of the image processing apparatus according to the embodiment of the present invention.

FIG. 3 is a conceptual view showing a configuration of the image processing apparatus 100 according to the embodiment of the present invention. The expression of the configuration is compliant with the USB communication standard. The USB function control unit 113 controls the USB interface according to this configuration.

A device 301 represented by the largest frame can be defined solely according to the USB communication standard, and indicates an attribute of the entire apparatus. The apparatus mentioned herein corresponds to the image processing apparatus 100. The attribute of the device 301 is expressed by a device descriptor which includes an apparatus manufacturer ID, a product ID, a release number, the number of configurations and so forth. In this embodiment, the number of configurations is "1".

Accordingly, in the device 301, only one configuration (configuration 1 (302)) is defined. An attribute of the configuration 1 (302) is expressed by a configuration descriptor which includes the number of interfaces in the configuration. In this embodiment, the number of interfaces is "3".

Accordingly, in the configuration 1 (302), three interfaces (interfaces 0 to 2 (304, 307, 311)) are defined. Attributes of the interfaces 0 to 2 (304, 307, 311) are expressed by an interface descriptor which includes the number of end points in the interface, a class code and so forth. In this embodiment, the number of end points (the number of logical channels) in the interface 0 (304) used for a printer is "2"; the number of end points in the interface 1 (307) used for a scanner is "3"; and the number of end points in the interface 2 (311) used for FAX transmission/reception is "3".

Accordingly, in the interface 0 (304) used for a printer, two end points (end points 1 and 2 (305, 306)) are defined. Attributes of the end points 1 and 2 (305, 306) are expressed by an end point descriptor which includes an end point number of the end point, a communication direction, the type of transfer, a packet size and so forth. The end point 1 (305) is used mainly for receiving control data or print data. Note that a printing unit information registration command transmitted by driver software started on the processing apparatus 200 is received by the CPU 101 of the image processing apparatus 100 via the end point 1 (305), and the command is transferred to the printing unit 115 via an end point 1 (406) which will be described later, thereby registering in the printing unit items of status information of the printing unit 115 to be acquired by the driver software. The end point 2 (306) is used mainly for receiving a print status from the printing unit 115, which is returned in response to a reverse request of a print-data printing status, and transferring the received print status to an external apparatus, such as the processing apparatus 200.

Furthermore, in the interface 1 (307) used for a scanner, three end points (end points 3, 4 and 5 (308, 309, 310)) are defined. Attributes of the end points 3, 4 and 5 (308, 309, 310) are expressed by an end point descriptor which includes an end point number of the end point, a communication direction, the type of transfer, a packet size and so forth. The end point 3 (308) is used mainly for transmitting read data. The end point 4 (309) is used mainly for receiving control data. The end point 5 (310) is used mainly for informing a start of scanning.

Furthermore, in the interface 2 (311) used for FAX transmission/reception, three end points (end points 6, 7 and 8 (312, 313, 314)) are defined. Attributes of the end points 6, 7 and 8 (312, 313, 314) are expressed by an end point descriptor which includes an end point number of the end point, a communication direction, the type of transfer, a packet size and so forth. The end point 6 (312) is used mainly for receiving control data and FAX transmission data. The end point 7 (313) is used mainly for transmitting FAX reception data and a communication state of FAX transmission/reception. The end point 8 (314) is used mainly for informing an end of FAX reception.

Figure 4:
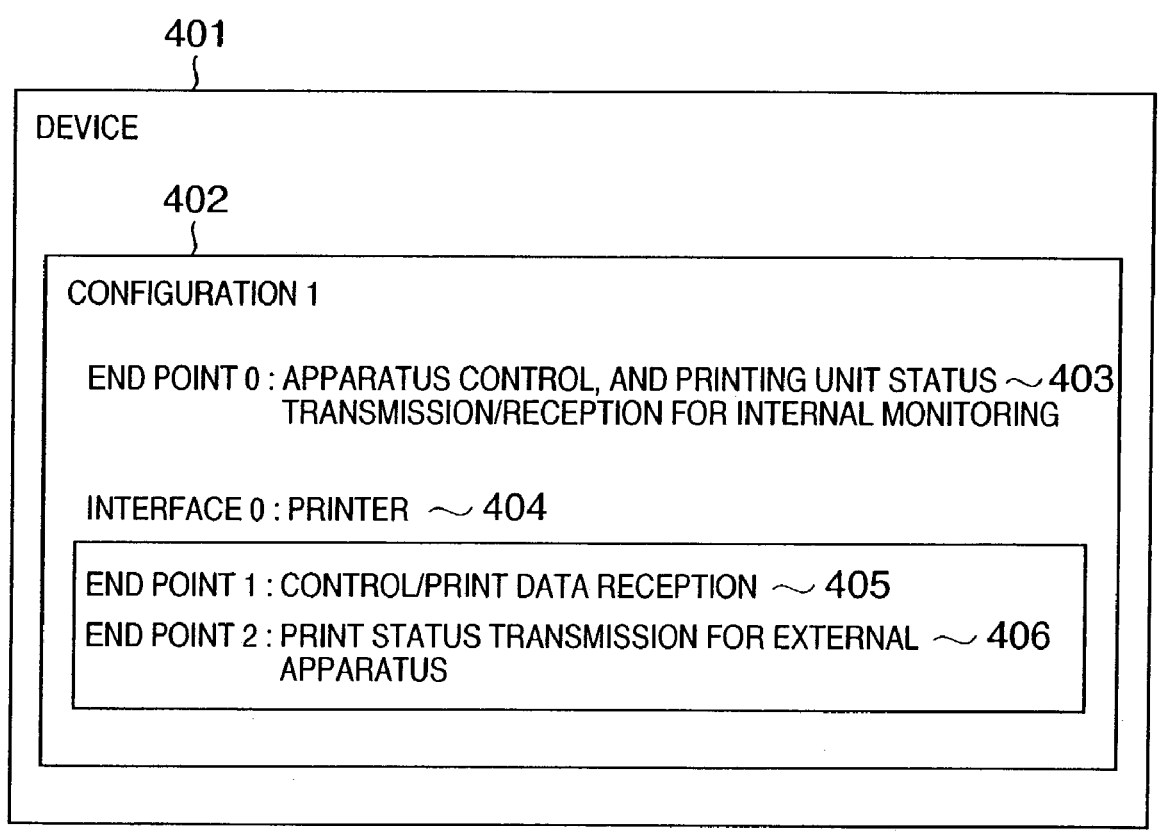
FIG. 4 is a conceptual view showing a USB configuration of a printing unit according to the embodiment of the present invention.

FIG. 4 is a conceptual view showing a configuration of the printing unit 115 according to the embodiment of the present invention. The expression of the configuration is compliant with the USB communication standard.

A device 401 represented by the largest frame can be defined solely according to the USB communication standard, and indicates an attribute of the entire apparatus. The apparatus mentioned herein corresponds to the printing unit 115. The attribute of the device 401 is expressed by a device descriptor which includes an apparatus manufacturer ID, a product ID, a release number, the number of configurations and so forth. In this embodiment, the number of configurations is "1".

In the device 401, only one configuration (configuration 1 (402)) is defined. An attribute of the configuration 1 (402) is expressed by a configuration descriptor which includes the number of interfaces in the configuration, and an end point 0. The end point 0 (403) is used for controlling the printing unit 115, and serves as a transmission channel of configuration data of the printing unit 115. Moreover, the end point 0 (403) is also used for receiving a reverse request of status information from the CPU 101 of the image processing apparatus 100 and transferring the status information. Note in this embodiment, the number of interfaces is "1".

Accordingly, in the configuration 1 (402), only one interface (interface 0 (404)) is defined. An attribute of the interface 0 (404) is expressed by an interface descriptor which includes the number of end points in the interface, a class code and so forth. In this embodiment, the number of end points in the interface 0 (404) used for printing is "2".

In the interface 0 (404) used for printing, two end points (end points 1 and 2 (405, 406)) are defined. Attributes of the end points 1 and 2 (405, 406) are expressed by an end point descriptor which includes an end point number of the end point, a communication direction, the type of transfer, a packet size and so forth. The end point 1 (405) is used mainly for receiving control data and print data. Note that a printing unit information registration command, transmitted by driver software running on the processing apparatus 200 and received via the end point 1 (305) in FIG. 3, is transferred to the printing unit 115 via the end point 1 (405) in FIG. 4, thereby registering in the printing unit 115 items of status information of the printing unit 115 to be acquired by the driver software. The end point 2 (406) is used mainly for transmitting a received print status of print data to an external apparatus, such as the processing apparatus 200.

Figure 5:
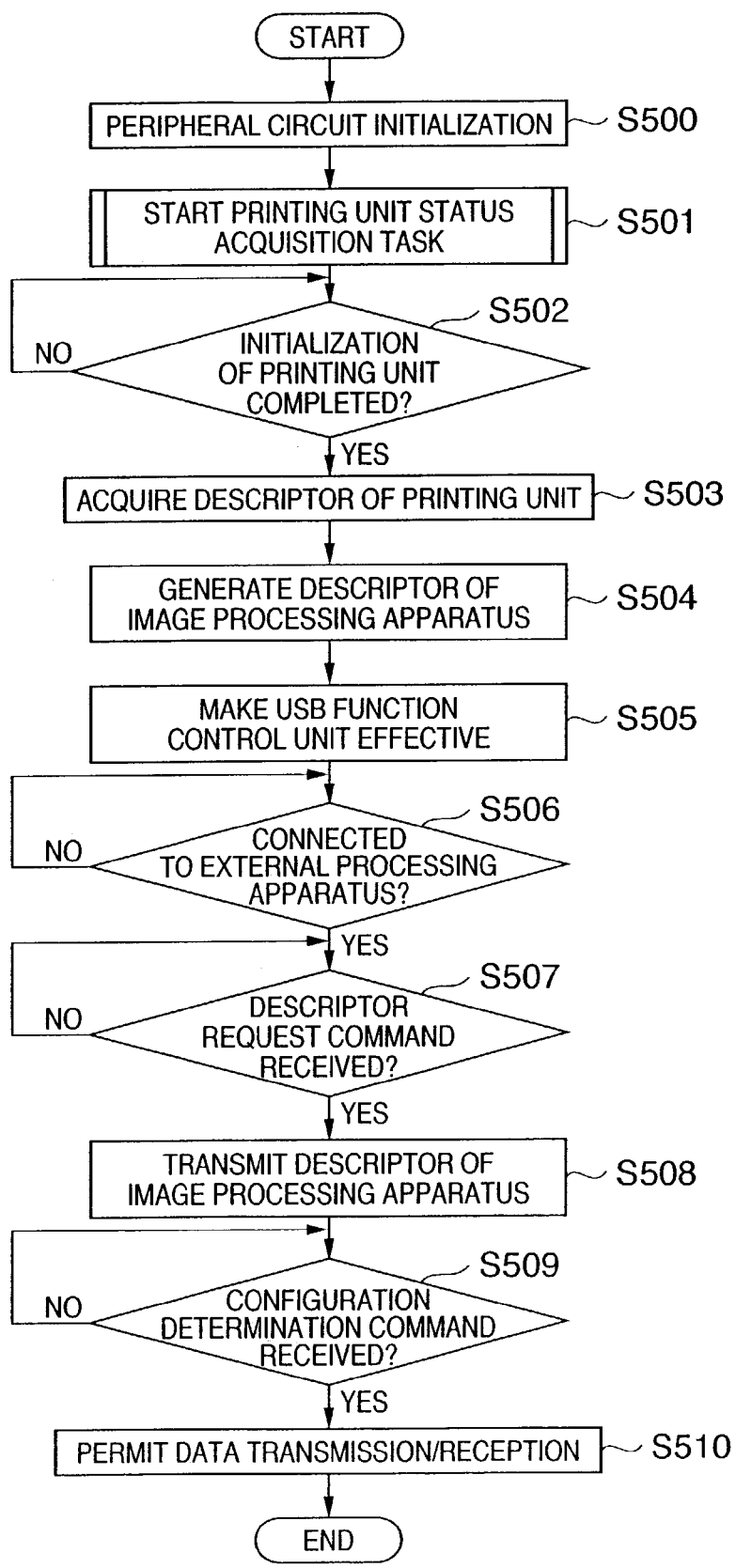
FIG. 5 is a flowchart describing an initialization operation of the image processing apparatus according to the embodiment of the present invention.

Next, initialization processing of the image processing apparatus 100, having the above-described construction, is described in detail with reference to the flowchart in FIG. 5. Note that the initialization processing is executed by the CPU 101.

When the power of the image processing apparatus 100 is turned on, the peripheral circuits connected with the CPU bus 121 are initialized in step S500.

In step S501, a status acquisition task (to be described later) of the printing unit 115 is started. In step S502, it is determined whether or not initialization of the printing unit 115, controlled by another CPU (not shown) different from the CPU 101, has been completed. If YES, the control proceeds to step S503. If NO, step S502 is repeated. Initialization completion of the printing unit 115 can be detected by executing the task for acquiring the status of the printing unit 115, which is started in step S501, via the USB interface of the USB host control unit 114. Alternatively, it can also be detected by directly connecting the CPU 101 with the printing unit 115 by a monitoring line.

In step S503, the CPU 101 acquires data indicative of the apparatus configuration of the printing unit 115, which is detected by the USB host control unit 114, and transmits an apparatus configuration determination command (Set_Configuration command) to the printing unit 115 to be activated. For the acquisition of apparatus configuration data of the printing unit 115, the USB interface is employed. The apparatus configuration data is transmitted or received via a logical channel of the end point 0 (403) shown in FIG. 4, which is used for apparatus controlling. The apparatus configuration data of the printing unit 115 includes the above-described device descriptor, configuration descriptor, interface descriptor, end point descriptors (1, 2) and so on, and further includes character strings representing a manufacturer of the printing unit 115, a product name, a serial number and so on. For transmission of the apparatus configuration determination command to the printing unit 115, the USB interface is employed. The apparatus configuration determination command data is transmitted via the logical channel of the end point 0 (403) shown in FIG. 4, which is used for apparatus controlling. By executing the foregoing steps at the time of power-on initialization of the image processing apparatus 100, it is possible to assure initialization of the image processing apparatus 100. Moreover, when the apparatus configuration data of the entire image processing apparatus 100 is informed to the processing apparatus 200 (to be described later), it is possible to respond quickly to an apparatus configuration data acquisition command transmitted from the processing apparatus 200.

In step S504, apparatus configuration data of the entire image processing apparatus 100 is generated. The apparatus configuration data is transmitted or received via a logical channel of the end point 0 (303) shown in FIG. 3, which is used for apparatus controlling. The apparatus configuration data of the entire image processing apparatus 100 includes the above-described device descriptor, configuration descriptor, interface descriptors (0 to 2), end point descriptors (1 to 8) and so on, and further includes character strings representing a manufacturer of the entire image processing apparatus 100, a product name, a serial number and so on.

As a part of the apparatus configuration data of the entire image processing apparatus 100, a part of the apparatus configuration data of the printing unit 115 acquired in step S503 is used. For instance, the interface descriptor 0 (304) used for a printer, which is shown in FIG. 3, has the same configuration as the interface descriptor received from the printing unit 115 in step S503, so that print data transmitted from the processing apparatus 200 to the image processing apparatus 100 through the USB interface can be transferred to the printing unit 115 through the USB interface without a change, and print status data transmitted from the printing unit 115 to the USB host control unit 114 through the USB interface can be transferred to the processing apparatus 200 through the USB interface without a change.

By virtue of the aforementioned control, it is possible to configure the image processing apparatus 100 independent of the type of printing unit 115. More specifically, even in a case where the printing unit 115 is changed to a latest printing unit, the processing steps shown in the flowchart in FIG. 5 need not be changed.

In step S505, to permit communication between the image processing apparatus 100 and processing apparatus 200, the USB function control unit 113 is shifted to a communication effective state. By this stage, initialization of the entire image processing apparatus 100 ends, and the apparatus holds an event-wait state in a standby state.

In step S506, it is determined whether or not the image processing apparatus 100 is connected with the processing apparatus 200. If YES, the control proceeds to step S507. If NO, step S506 is repeated. The detection of the connection between the image processing apparatus 100 and processing apparatus 200 can be performed by a USB interface of the USB function control unit 113.

In step S507, it is determined whether or not an apparatus configuration data acquisition command (Get_Device_Descriptor command, Get_Configuration_Descriptor command, Get_String_Descriptor command, Get_Device_ID command) is received from the processing apparatus 200 which is connected with the image processing apparatus 100. If YES, the control proceeds to step S508. If NO, step S507 is repeated.

In step S508, the CPU 101 informs the processing apparatus 200 of the apparatus configuration data of the entire image processing apparatus 100, which is generated in step S504. The apparatus configuration data is transmitted via the logical channel of the end point 0 (303) shown in FIG. 3, which is used for apparatus controlling.

In step S509, it is determined whether or not the image processing apparatus 100 has received an apparatus configuration determination command (Set_Configuration command) from the processing apparatus 200. If YES, the control proceeds to step S510. If NO, step S509 is repeated. The apparatus configuration determination command is received via the logical channel of the end point 0 (303) shown in FIG. 3, which is used for apparatus controlling.

In step S510, the image processing apparatus 100 makes the apparatus configuration usable, and shifts to a print-data-reception standby state.

At this stage, if there is an error of some kind in the printing unit 115, such as no ink, no toner, no printing paper, paper jamming or the like, and the printing unit 115 is not ready to receive the print data, the USB function control unit 113 and processing apparatus 200 are set in the state where print data reception is not ready. For instance, if the printing unit 115 detects a crucial error in the printing unit 115 at the time of initializing the printing unit 115 in step S502, the printing unit 115 sets the state where print data cannot be received. The CPU 101, which detects this state through the USB host control unit 114 in step S503, sets the USB function control unit 113 in step S504 in the state where print data reception is not ready, and informs the processing apparatus 200 of this state in step S508. By virtue of this control, the processing apparatus 200 can be informed that the printing unit 115 is not ready to receive print data. Accordingly, since the print data from the processing apparatus 200 is no longer stored and retained in the image memory 104, operation troubles can be prevented.

Moreover, also in a case where a similar error occurs in the printing unit 115 in a standby state after initialization or after completion of printing operation, the state where print data reception is not ready is set in the USB function control unit 113 to achieve the similar effect.

Furthermore, the above description also applies to a case where the printing unit 115 is not ready to transmit data indicative of print statuses. If there is an error of some kind in the printing unit 115, such as no ink, no toner, no printing paper, paper jamming or the like, and the printing unit 115 is not ready to transfer the data indicative of print statuses, the USB function control unit 113 and processing apparatus 200 are set in the state where print-status-data transfer is not ready. For instance, if the printing unit 115 detects a crucial error in the printing unit 115 at the time of initializing the printing unit 115 in step S502, the printing unit 115 sets the state where data indicative of print statuses cannot be transferred. The CPU 101, which detects this state through the USB host control unit 114 in step S503, sets the USB function control unit 113 in step S504 in the state where print-status-data transfer is not ready. By virtue of this control, even in a case where a transfer request of the data indicative of print statuses is transmitted by the processing apparatus 200, the processing apparatus 200 can be informed that the printing unit 115 is not ready to transfer data indicative of print statuses by returning the state where print-status-data transfer is not ready to the processing apparatus 200. Accordingly, operation troubles in the processing can be prevented.

Moreover, also in a case where a similar error occurs in the printing unit 115 in a standby state after initialization or after completion of printing operation, the state where print-status-data transfer is not ready is set in the USB function control unit 113 to achieve the similar effect.

Note that steps S503 and S504 are not necessarily performed immediately after step S502. For instance, processing of steps S503 and S504 may be performed immediately after the connection between the image processing apparatus 100 and processing apparatus 200 is confirmed in step S506. In this case, it is possible to reduce the power-on initialization process of the image processing apparatus 100, thereby reduce the time lag between the power-on and apparatus-ready state of the image processing apparatus 100.

Alternatively, steps S503 and S504 may be performed immediately after the apparatus configuration data acquisition command is received from the processing apparatus 200 connected with the image processing apparatus 100 in step S507. In this case, until the apparatus configuration data acquisition command is received, it is not necessary to acquire apparatus configuration data of the printing unit 115 or generate apparatus configuration data of the entire image processing apparatus 100. Accordingly, an algorithm of the control program can be simplified.

Furthermore, in step S503, the acquisition of the apparatus configuration data from the printing unit 115 and transmission of the apparatus configuration determination command to the printing unit 115 are not necessarily performed simultaneously. For instance, the transmission of the apparatus configuration determination command to the printing unit 115 may be executed at the timing that print data is received from the processing apparatus 200. In this case, by virtue of separately performing the acquisition of the apparatus configuration data from the printing unit 115 and the transmission of the apparatus configuration determination command to the printing unit 115, an effect of clarified algorithm of the control program can be expected.

Next, the acquisition process of status information of the printing unit 115 in image processing apparatus 100 is described in detail.

Figure 6:
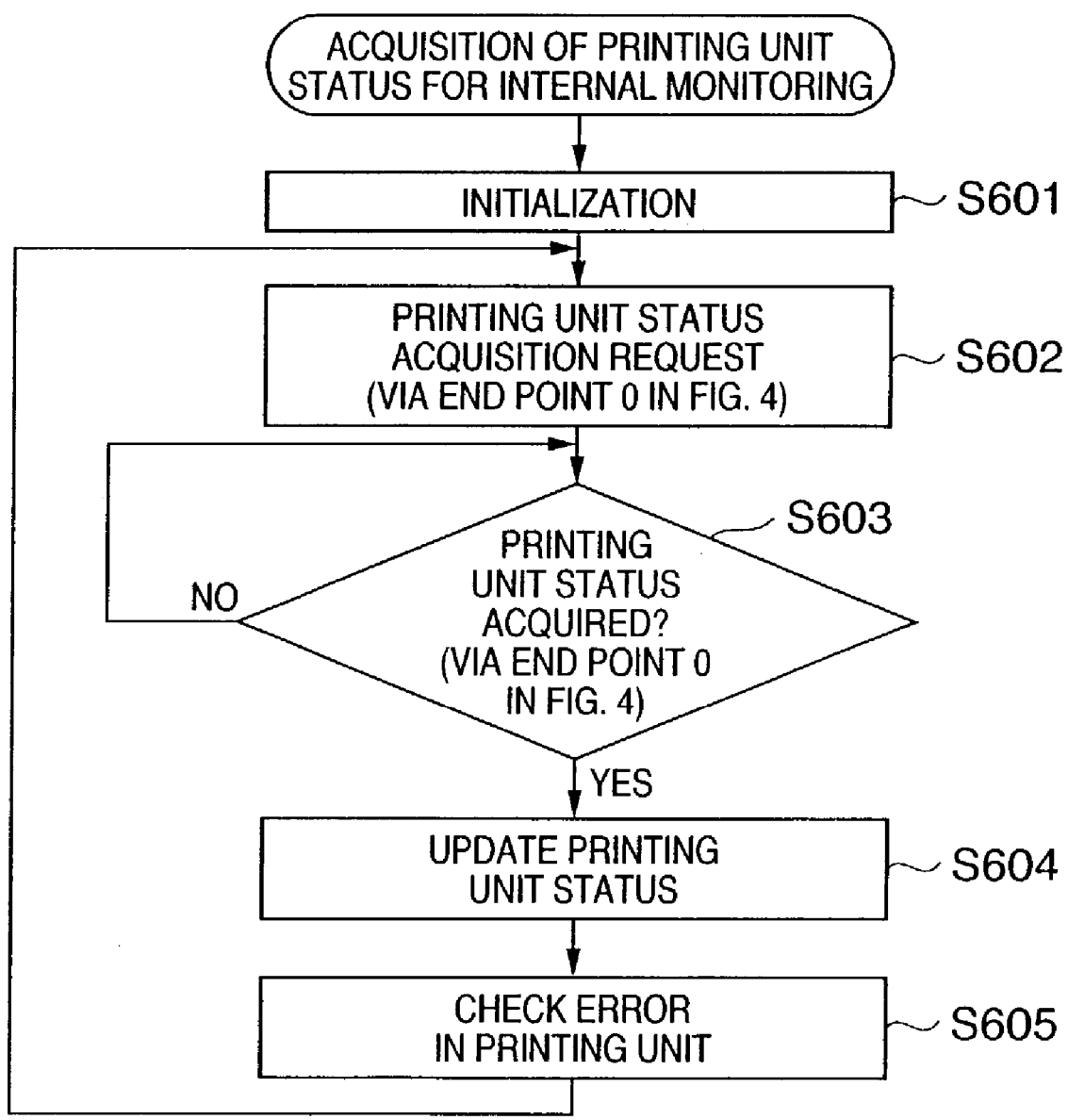
FIG. 6 is a flowchart describing an acquisition procedure of printing unit status information for internal monitoring by the image processing apparatus according to the embodiment of the present invention.

FIG. 6 is a flowchart describing an acquisition procedure of status information of the printing unit 115 for monitoring an internal unit, performed by the CPU 101 of the image processing apparatus 100 according to the embodiment of the present invention. This processing is performed at predetermined timing, for instance, when the power of the image processing apparatus 100 is turned on or when the printing unit 115 prints image data obtained by the reading unit 107. The timing of this processing is not limited to them, but the processing is performed as necessary and/or regularly.

In step S601, initialization necessary to acquire status information of the printing unit 115 is performed. Then, the USB host control unit 114 of the image processing apparatus 100 and the USB function unit of the printing unit 115 are shifted to a communication-ready state. By this control, the printing unit 115 becomes a standby state for receiving a printing unit status request command from the print control unit 112.

In step S602, the print control unit 112 transfers a printing unit status request command to the printing unit 115 through the USB host control unit 114. Used as the transmission path of the command is the end point 0 serving as a USB logical channel in the configuration 402 shown in FIG. 4. The end point 0 is generally used in two-way command transmission. A host (CPU 101 in this case) issues a command, called a device request, to a target (printing unit 115 in this case). Then, the target processes the command and returns data to the host if necessary. A device request is an 8-byte command, which includes in broad categories, a command common to all USB devices (Standard Request), a command decided by each device class (Class Request), and a command freely decided by each vendor (Vendor Request). According to this invention, the CPU 101 of the image processing apparatus 100 employs the Vendor Request for transmitting a printing unit status command to the printing unit 115. Upon reception of the printing unit status command, the printing unit 115 returns information regarding the status of the printing unit, which corresponds to the command, to the print control unit 112 using the end point 0 shown in FIG. 4.

In step S603, the print control unit 112 monitors whether or not printing unit status information returned from the printing unit 115 has been received. When it is received, the control proceeds to step S604.

In step S604, database is updated in accordance with the acquired printing unit status information.

In step S605, acquired error information of the printing unit 115 is checked, and a corresponding error status of the printing unit is updated. Then the control returns to step S602.

Next, printing operation of the image processing apparatus 100 is described in detail with reference to FIGS. 7 to 9.

Figure 7:
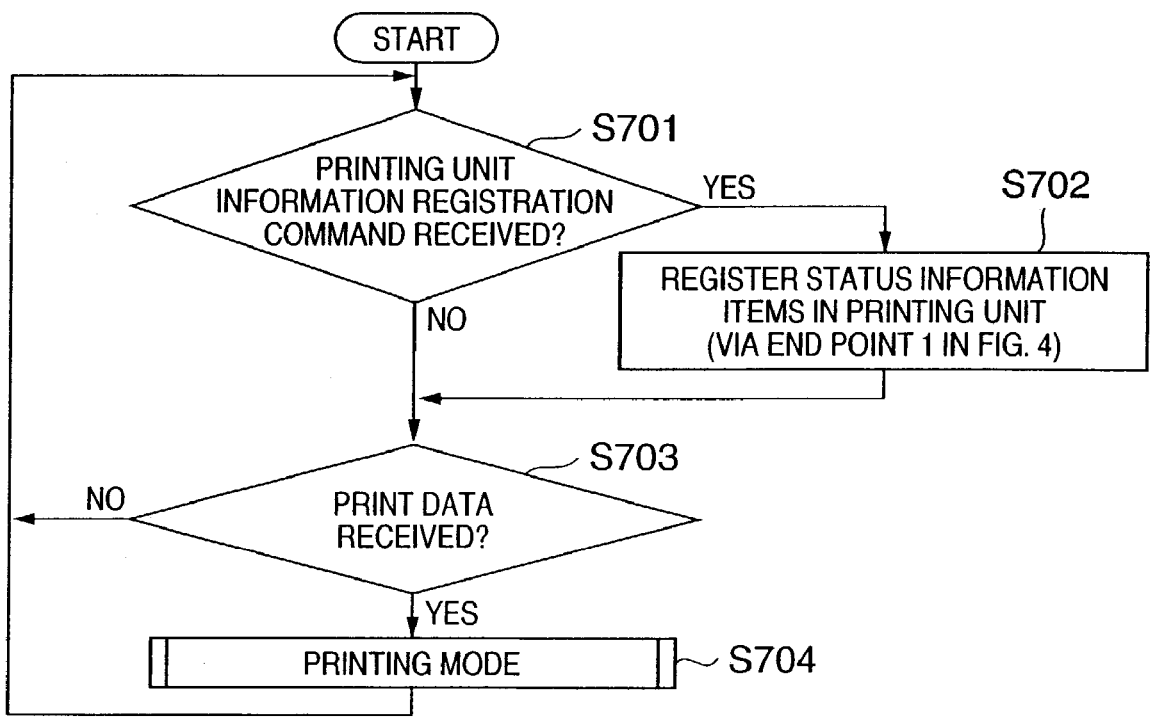
FIG. 7 is a flowchart describing a print-operation start procedure according to the embodiment of the present invention.

FIG. 7 is a flowchart describing a printing operation of the image processing apparatus 100, which is executed by the CPU 101 upon reception of image data from the external processing apparatus 200.

First in step S701, it is determined whether or not a printing unit information registration command is received from the processing apparatus 200. If YES, the control proceeds to step S702, and the received command is transferred to the printing unit 115 via the end point 1 (405) of the USB host control unit 114. Accordingly, an item/items of status information of the printing unit 115, which is/are requested by the processing apparatus 200, is/are registered in the printing unit 115.

If a printing unit information registration command is not received in step S701, or after the item of status information is registered in step S702, it is determined in step S703 whether or not the image processing apparatus 100 has received print data from the processing apparatus 200. If YES, the control proceeds to step S704. If NO, the control returns to step S701 to repeat the foregoing processing. The print data is received via a logical channel of the end point 1 (305) shown in FIG. 3, which is used for receiving control data and print data. Furthermore, the print data is received in a packet form, delimited in a predetermined length.

In step S704, the image processing apparatus 100 shifts to a printing mode for printing the print data received from the processing apparatus 200. Details of the printing mode will be described later. When the printing mode ends, the image processing apparatus 100 shifts again to the standby state for receiving print data from the processing apparatus 200.

Next, an operation of the image processing apparatus 100 in the printing mode (step S704 in FIG. 7) for printing the data transmitted from the external processing apparatus 200 is described in detail.

Figure 8:
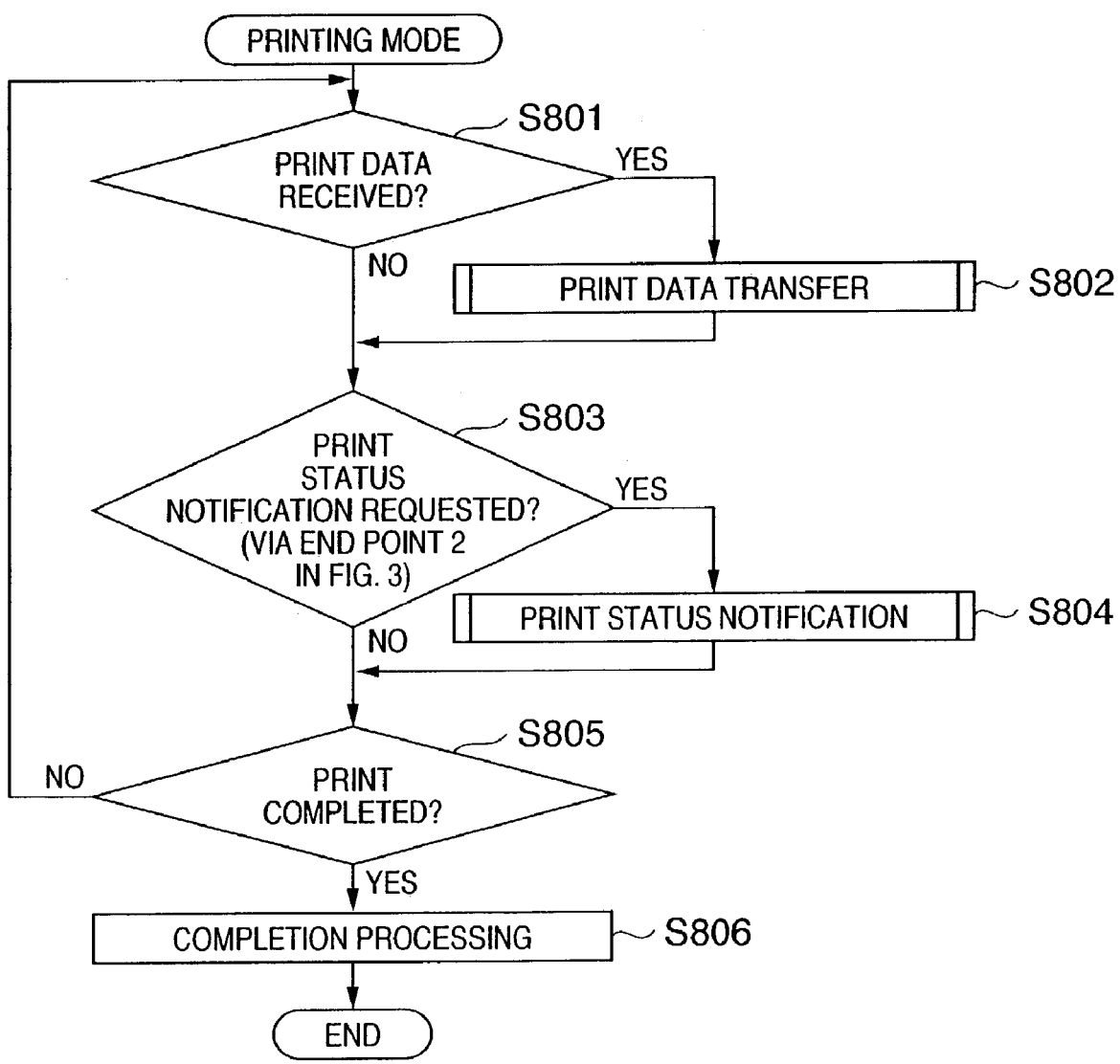
FIG. 8 is a flowchart describing an operation of printing image data transmitted by an external apparatus according to the embodiment of the present invention.

FIG. 8 is a flowchart describing a printing operation of the image processing apparatus 100 performed by the CPU 101 in response to print data transmitted by the external processing apparatus 200 according to the embodiment of the present invention.

First, in step S801, it is determined whether or not the image processing apparatus 100 has received print data from the processing apparatus 200. If YES, the control proceeds to step S802. If NO, the control proceeds to step S803. The print data is received via the logical channel of the end point 1 (305) shown in FIG. 3, which is used for receiving control data and print data. The received print data is temporarily stored in the image memory 104 of the image processing apparatus 100. Furthermore, the print data is received in a packet form, delimited in a predetermined length.

In step S802, the image processing apparatus 100 transfers the print data, received from the processing apparatus 200 and stored in the image memory 104, to the printing unit 115. Details of the print data transfer will be described later. Upon completion of the processing in step S802, the control proceeds to step S803.

In step S803, it is determined whether or not the image processing apparatus 100 has received a print status notification request from the processing apparatus 200. If YES, the control proceeds to step S804. If NO, the control proceeds to step S805. The print status notification request is received via a logical channel of the end point 2 (306) shown in FIG. 3, which is used for transmitting a print status. Note the reception of the print status notification request is not reception of actual data, but is reception of an IN packet compliant with the USB communication standard.

In step S804, the image processing apparatus 100 receives data indicative of print statuses from the printing unit 115, and transfers the received data indicative of print statuses to the processing apparatus 200. Details of the print-status-data transfer will be described later. Upon completion of the processing in step S804, the control proceeds to step S805.

In step S805, it is determined whether or not print data from the processing apparatus 200 has ended. If YES, the control proceeds to step S806. If NO, the control returns to step S801. The end of print data from the processing apparatus 200 can be detected by analyzing only a part of the data indicative of print statuses, which is acquired in step S804, and determining whether printing operation is in progress or completed. Herein, the data indicative of print statuses is a series of character strings representing whether printing of the printing unit 115 is in progress or completed, the residual amount of toner or ink in the printing unit 115, a print error state of the printing unit 115, the remaining amount of memory in the printing unit 115 and so forth. Analyzing a part of the data indicative of print statuses indicates the following processing. Namely, only a character string indicative of whether printing of the printing unit 115 is in progress or completed is extracted from the data indicative of print statuses of the printing unit 115 (a series of character strings representing whether printing of the printing unit 115 is in progress or completed, the residual amount of toner or ink in the printing unit 115, a print error state of the printing unit 115, the remaining amount of memory in the printing unit 115 and so forth), which is temporarily stored in the image memory 104 of the image processing apparatus 100, and analyzed as to whether the printing is in progress or completed. Herein, the data indicative of print statuses of the printing unit 115 is not analyzed entirely. According to this determination method, since data indicative of print statuses is not entirely analyzed, but only a character string indicative of whether printing of the printing unit 115 is in progress or completed is extracted and analyzed, it is possible to assure detection of print completion and reduce a processing load of the CPU 101.

Note that the print data end detection method is not limited to the above-described method but, for instance, the following method is available. More specifically, print data from the processing apparatus 200 is normally transmitted in a packet having a predetermined fixed length. For instance, it is often the case that 64 bytes are used as a transfer unit. However, print data from the processing apparatus 200 does not always have a data length which is exactly divisible by 64 bytes. In this case, the last packet of the print data from the processing apparatus 200 is naturally a short packet having less than 64 bytes. For instance, assume that a print data length is 100,000 bytes and a normally used packet length is 64 bytes. Dividing the total print data length 100,000 bytes by the packet length 64 bytes results in quotient 1,562 with remainder 32. Therefore, the CPU 101 transfers 1,562 64-byte packets and one short 32-byte packet. By detecting the last short packet, the end of print data can be detected. Furthermore, there may be a case where the total print data length is exactly divisible by 64 bytes. In this case, it is a general practice to transfer a null packet having 0 data length after all the print data is transferred. By detecting the null packet, the CPU 101 is able to detect print data end even in a case where the total print data length is exactly divisible by 64 bytes. According to this determination method, by merely monitoring a packet length of print data from the processing apparatus 200, it is possible to assure detection of print completion, and a simplified processing program can be expected.

Alternatively, the following print data end detection method is possible. More specifically, referring to FIG. 8, when print data reception ends, the control no longer proceeds to step S802. The number of times the control directly proceeds from step S801 to S803 consecutively is counted, and when the counted number exceeds a predetermined value, the end of print data can be determined. According to this determination method, by merely counting the number of times the control directly proceeds from step S801 to S803 and determining whether or not a predetermined number of times has been counted, it is possible to assure detection of print completion, and a simplified processing program can be expected.

Furthermore, the following print data end detection method is possible. More specifically, referring to FIG. 8, when print data reception ends, the control no longer proceeds to step S802. The time period the control directly proceeds from step S801 to S803 consecutively is timed, and when the time period exceeds a predetermined time period, the end of print data can be determined. According to this determination method, by merely timing the time period the control directly proceeds from step S801 to S803 and determining whether or not a predetermined time period has lapsed, it is possible to assure detection of print completion, and a simplified processing program can be expected.

When print completion is determined in step S805, the control proceeds to step S806 where print-operation completion processing is performed. Print-operation completion processing includes discharging a printing material outside the apparatus, sounding print-operation completion alarm from a speaker (not shown), informing print-operation completion by the operation display unit 108 or display unit 208, and so forth.

Figure 9:
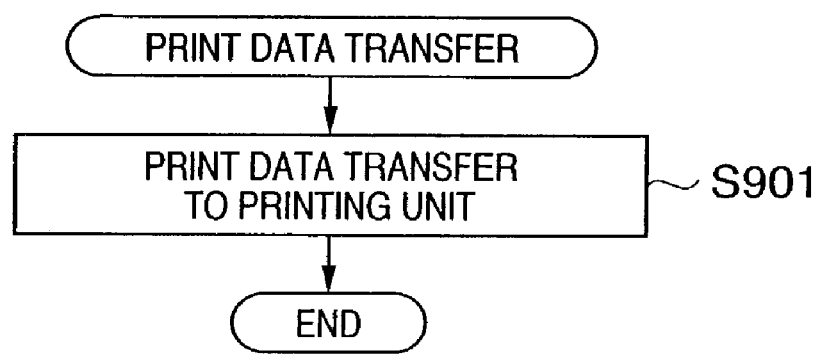
FIG. 9 is a flowchart describing a print data transfer process according to the embodiment of the present invention.

FIG. 9 is a flowchart describing a print data transfer process of the image processing apparatus 100 executed by the CPU 101, which is performed in step S802 in FIG. 8.

In step S901, the print data received in step S801 is transferred to the printing unit 115. The CPU 101 temporarily stores in the image memory 104 of the image processing apparatus 100 the print data received via the logical channel of the end point 1 (305) shown in FIG. 3, which is used for receiving control data and print data, and transfers the data to a logical channel of the end point 1 (405) shown in FIG. 4, which is used for receiving control data and print data. At this stage, the CPU 101 transfers the print data as it is, without performing any editing or processing on the content of the print data transferred from the end point 1 (305) to the end point 1 (405). The print data is transferred in a packet form, delimited in a predetermined length. Note that the interface 0 (304) in the device 301 shown in FIG. 3 and interface 0 (404) in the device 401 shown in FIG. 4 are employed so that one can assume the other does not exist. More specifically, processing of the printer driver software installed in the processing apparatus 200 is not at all different from the case where the processing apparatus 200 is directly connected with the printing unit 115 through a USB interface. Therefore, in a case where the printing unit 115 is changed to a different one, the printer driver software for the changed printing unit can be used without alteration.

Figure 10:
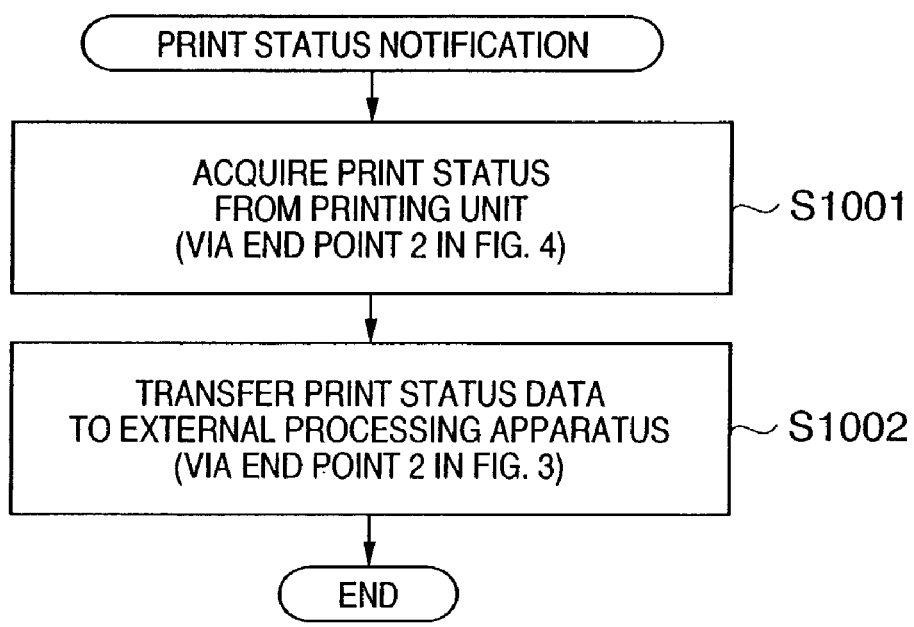
FIG. 10 is a flowchart describing a print status data transfer process according to the embodiment of the present invention.

FIG. 10 is a flowchart describing a print-status-data transfer process of the image processing apparatus 100 executed by the CPU 101. This is performed in step S804 in FIG. 8 when the image processing apparatus 100 receives a print status notification request from the external processing apparatus 200 in step S803.

In step S1001, the CPU 101 acquires data indicative of print statuses from the printing unit 115 by controlling the USB host control unit 114. The data indicative of print statuses is acquired via the logical channel of the end point 2 (406) shown in FIG. 4, which is used for transmitting a print status. The acquired data indicative of print statuses is temporarily stored in the image memory 104 of the image processing apparatus 100. Note that the acquired data indicative of print statuses has a packet form delimited in a predetermined length.

In step S1002, the CPU 101 transmits the data indicative of print statuses, which is temporarily stored in the image memory 104 of the image processing apparatus 100, to the logical channel of the end point 2 (306) shown in FIG. 3 which is used for transmitting a print status. At this stage, the CPU 101 transfers the data indicative of print statuses as it is, without performing any editing or processing on the content of the data indicative of print statuses which is transferred from the end point 2 (406) to the end point 2 (306). Furthermore, at this stage, by analyzing a part of the data indicative of print statuses which is temporarily stored in the image memory 104 of the image processing apparatus 100, print completion can be detected to be used for the print completion determination in step S805 in FIG. 8. The print status data is transferred in a packet form, delimited in a predetermined length. Note that the interface 0 (404) in the device 401 shown in FIG. 4 and interface 0 (304) in the device 301 shown in FIG. 3 are employed so that one can assume the other does not exist. More specifically, processing of the printer driver software installed in the processing apparatus 200 is not at all different from the case where the processing apparatus 200 is directly connected with the printing unit 115 through a USB interface. Therefore, in a case where the printing unit 115 is changed to a different one, the printer driver software for the changed printing unit can be used without alteration.

Next, a detailed description is provided on a printing operation of data generated (read) by an internal unit of the image processing apparatus 100, which is performed when the CPU 101 performs copying or the like.

Figure 11:
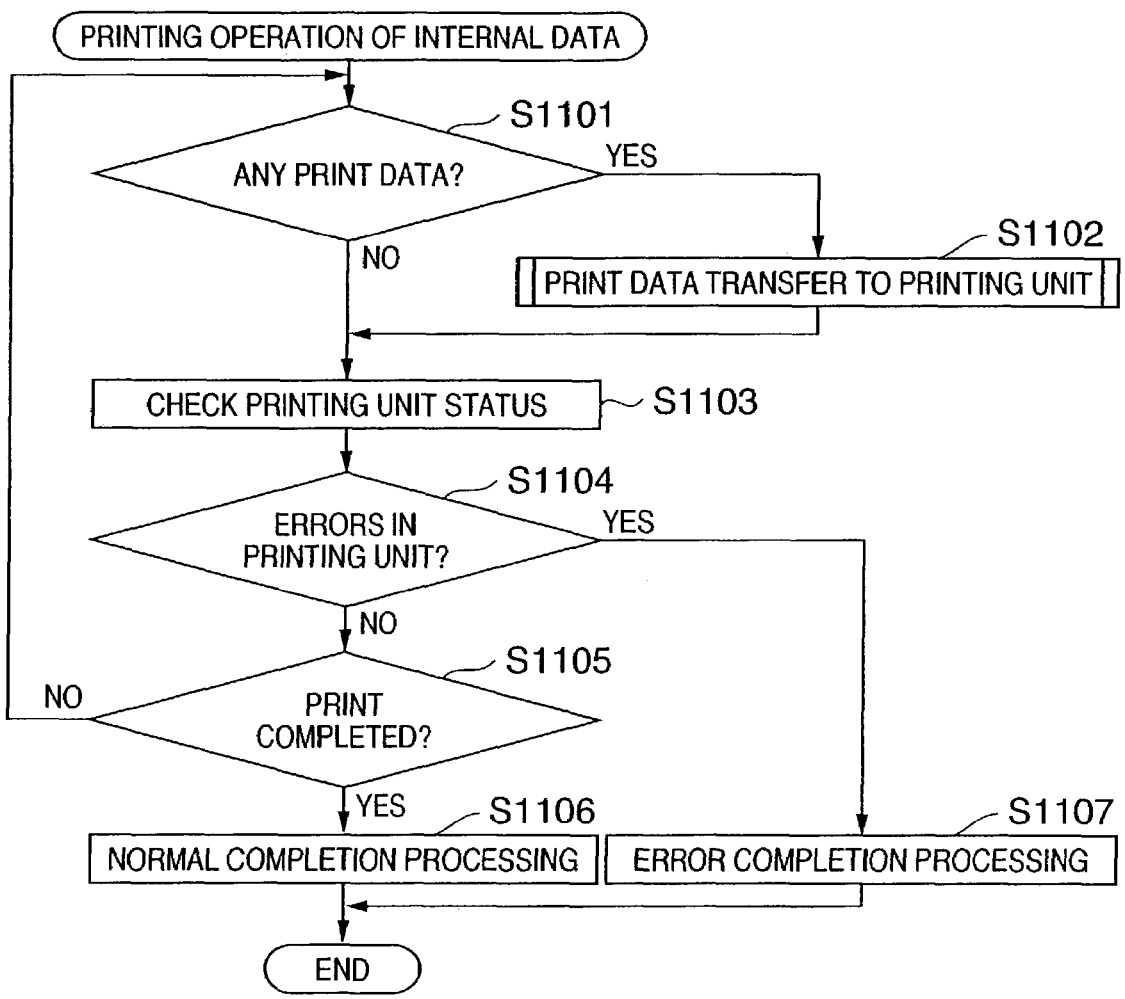
FIG. 11 is a flowchart describing an operation in a case of printing image data from an internal unit according to the embodiment of the present invention.
Figure 12:
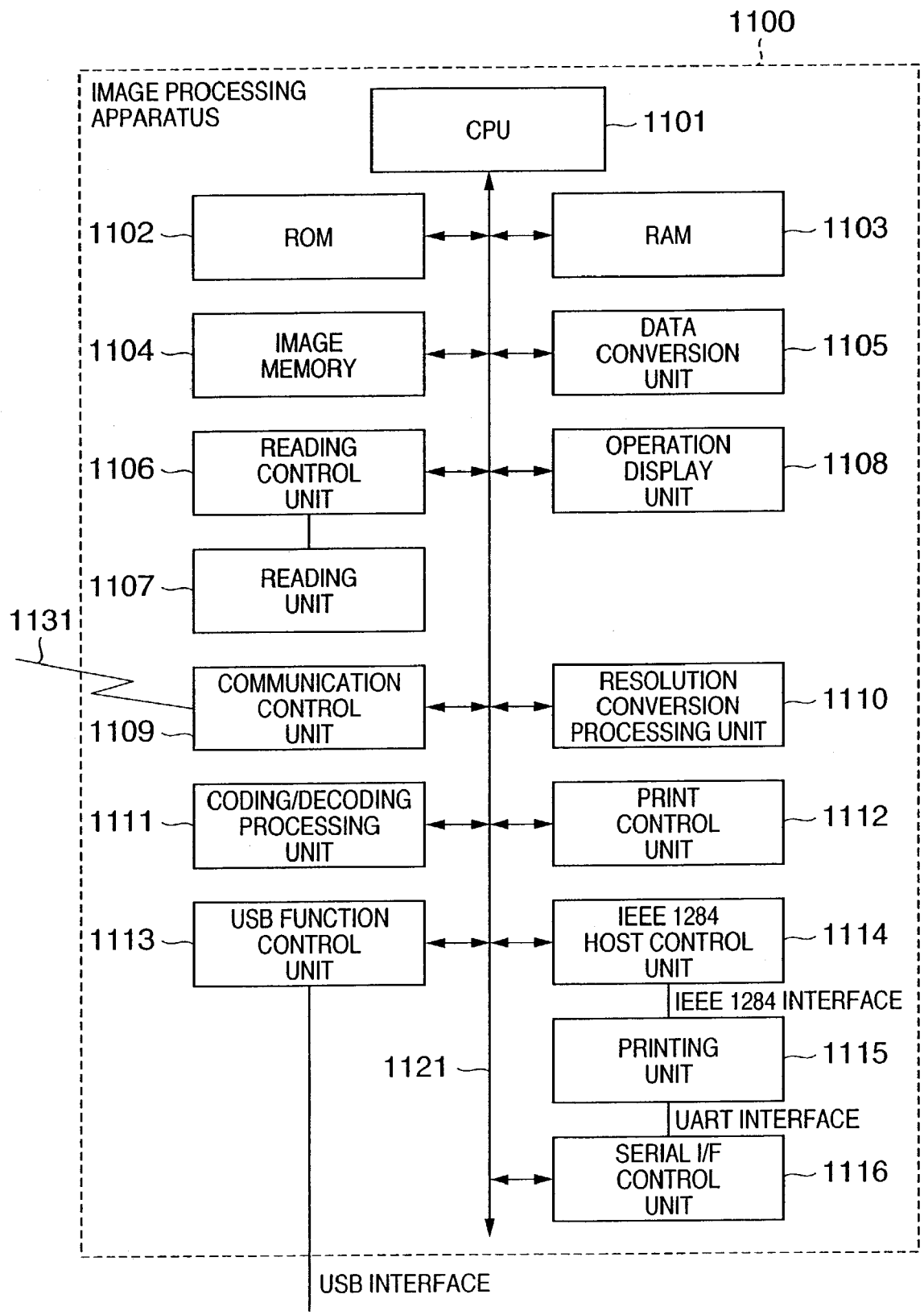
FIG. 12 is a block diagram showing a construction of a conventional image processing apparatus.

FIG. 11 is a flowchart describing a printing operation of data generated by an internal unit of the image processing apparatus 100 (e.g., data obtained by reading operation of the reading unit 107), in a case where the CPU 101 performs copying operation or the like according to the embodiment of the present invention.

In step S1101, it is determined whether or not any print data is stored in the image memory 104 of the image processing apparatus 100. If YES, the control proceeds to step S1102, but if NO, the control proceeds to step S1103.

In step S1102, the print data temporarily stored in the image memory 104 is transferred to the printing unit 115. The operation related to print data transfer is the same as that described in FIG. 9. Upon completion of the process in step S1102, the control proceeds to step S1103.

In step S1103, the status of the printing unit 115 is checked. Herein, status checking is performed by referring to the database which stores items of status information for internal monitoring. As described above with reference to FIG. 6, the printing unit status acquisition task for an internal unit is executed to acquire the status of the printing unit 115 through the end point 0 shown in FIG. 4, and items of the status information for internal monitoring are stored and updated in the database.

In step S1104, if an error is found in the printing unit 115 as a result of the status checking of the printing unit 115 in step S1103, the control proceeds to step S1107. If no error is found, the control proceeds to step S1105.

In step S1105, whether or not printing has been completed is determined by, e.g., reception/non-reception of a print completion command. If printing is completed, the control proceeds to step S1106. If printing is not completed, the control returns to step S1101 to repeat the above-described process.

Upon determination of print completion, normal completion processing of printing operation is performed in step S1106. The normal completion processing of printing operation is, for instance, discharging a printing material outside the apparatus, sounding a print-operation completion alarm from a speaker (not shown), informing print-operation completion by the operation display unit 108 or display unit 208, and so forth.

On the contrary, in step S1107, abnormal completion processing of printing operation is performed. The abnormal completion processing of printing operation is, for instance, discharging a printing material outside the apparatus, sounding an erroneous completion alarm from a speaker (not shown), informing print operation erroneous completion by the operation display unit 108 or display unit 208, and so forth.

By virtue of the above-described control, the end point 0 is used for internal monitoring of the image processing apparatus, and the end points 1 and 2 are used for registration of printing unit status information and for a reverse request from an external data processing terminal. Accordingly, different independent logical channels can be assigned to a request from the driver software working on a data processing terminal and to a request from an internal unit of the image processing apparatus, thereby enabling to acquire printing unit status information using different methods. Therefore, even in a case where items of printing unit status information necessary for the driver software working on a data processing terminal are different from items necessary for internal monitoring of the image processing apparatus, the requested printing unit status information can be acquired, thus preventing disadvantages, such as inconsistent status information.

Furthermore, since the driver software working on the data processing terminal and an internal unit of the image processing apparatus can use different independent logical channels to acquire printing unit status information using different methods, the main control unit no longer needs to determine whether a request is transmitted from an internal unit of the image processing apparatus or an external data processing terminal, unlike the case where one logical channel is used for acquiring printing unit status information. Accordingly, the control for printing unit status information acquisition becomes easy, preventing disadvantages, such as delayed response timing.

Moreover, since the end point 1 of the USB is normally used as an image data transmission channel, it tends to be busy due to printing unit errors. Such errors cause interruption in transmission of the printing unit information registration command from an external information processing terminal using the end point 1. Even in a case of such errors, since acquisition of the printing unit status information for internal monitoring of the image processing apparatus is performed via the end point 0, it is possible to prevent such situation that printing unit status information cannot be acquired.

Note, although the foregoing embodiment has described a case of acquiring status information of the printing unit 115, the present invention is not limited to the printing unit 115. A reading unit for reading an original document, an image sensing unit such as a digital camera for sensing an object, or a communication unit for transmitting/receiving data to/from an external device through a communication line may be connected to the image processing apparatus in place of the printing unit, and the similar control may be performed to achieve the same effects.

As set forth above, according to the present invention, in an image processing system including a data processing terminal and an image processing apparatus having a plurality of functions, it is possible to reliably and quickly perform registration of status information items in each function and acquisition of status information as necessary by the data processing terminal and an internal unit of the image processing apparatus.

<Other Embodiment>

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts of FIGS. 5 to 11 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
a data processing unit;
a first interface unit, having a plurality of logical channels, adapted to connect with an external processing apparatus;
a second interface unit, compliant with a same communication standard as said first interface unit and having a plurality of logical channels that have a different configuration from said first interface unit, adapted to connect with said data processing unit; and
a control unit adapted to control data transfer between said first interface unit and said second interface unit,
wherein said control unit controls to acquire status information, needed by the external processing apparatus, out of status information that said data processing unit possesses via a first logical channel of said second interface unit in response to a request from the external processing apparatus via a first logical channel of said first interface unit, and acquire status information, needed by said image processing apparatus, out of said status information that said data processing unit possesses via a second logical channel of said second interface unit regardless of existence/absence of a request from the external processing apparatus.

2. The image processing apparatus according to claim 1, wherein said control unit independently controls each of the acquisition of status information via the first logical channel and acquisition of status information via the second logical channel.

3. The image processing apparatus according to claim 1, wherein the communication standard is a universal serial bus (USB) standard.

4. The image processing apparatus according to claim 1, further comprising:
- a first bus connection unit connected to said control unit; and
- a second bus connection unit adapted to realize two-way connection between said control unit and said data processing unit.

5. The image processing apparatus according to claim 4, wherein said second bus connection unit is compliant with a universal serial bus (USB) communication standard.

6. The image processing apparatus according to claim 1, wherein said control unit performs two-way data transfer with said data processing unit via said second interface unit.

7. The image processing apparatus according to claim 1, wherein said control unit sets, via different logical channels of said second interface unit, first items of status information requested by the external processing apparatus and second items of status information to be acquired at the predetermined timing, and said data processing unit stores the first items and the second items separately.

8. The image processing apparatus according to claim 1 further comprising a designation unit adapted to designate to register the status information needed by the external processing apparatus to said data processing unit, wherein said control unit acquires the status information of which said designation unit designates the registration in response to the request from the external processing apparatus.

9. The image processing apparatus according to claim 1, further comprising a designation unit adapted to designate to register the status information needed by said image processing apparatus to said data processing unit, wherein said control unit acquires the status information of which said designation unit designates the registration.

10. A communication control method of an image processing apparatus including: a data processing unit; a first interface unit, having a plurality of logical channels, adapted to connect with an external processing apparatus; a second interface unit, compliant with a same communication standard as the first interface unit and having a plurality of logical channels that have a different configuration from the first interface unit, adapted to connect with the data processing unit; and a control unit adapted to control data transfer between the first interface unit and the second interface unit, said method comprising:

- a data reception step of receiving data from the external processing apparatus via the first interface unit;
- a determination step of determining whether or not the received data is a request command of status information of the data processing unit;
- a first data acquisition step of acquiring status information, needed by the external processing apparatus, out of status information that the data processing unit possesses via a first logical channel of the second interface unit in response to a request from the external processing apparatus via a first logical channel of said interface unit; and
- a second data acquisition step of acquiring status information, needed by said image processing apparatus, out of status information that the data processing unit possesses via a second logical channel of the second interface unit regardless of existence/absence of a request from the external processing apparatus.

11. The communication control method according to claim 10, further comprising:
- setting first items of status information requested by the external processing apparatus via a logical channel of the second interface unit;
- setting second items of status information, to be acquired at the predetermined timing, via a logical channel of the second interface unit different from the logical channel used for the first item setting; and
- storing the first items and the second items separately in the data processing unit.

12. The communication control method according to claim 10, wherein said first data acquisition step and said second data acquisition step are executed independently.

13. The communication control method according to claim 10, wherein the communication standard is a universal serial bus (USB) standard.

14. A computer-readable storage medium storing a program executable by a data processing apparatus, which has program codes for realizing the communication control method described in claim 10.

* * * * *